United States Patent Office 3,000,673
Patented Sept. 19, 1961

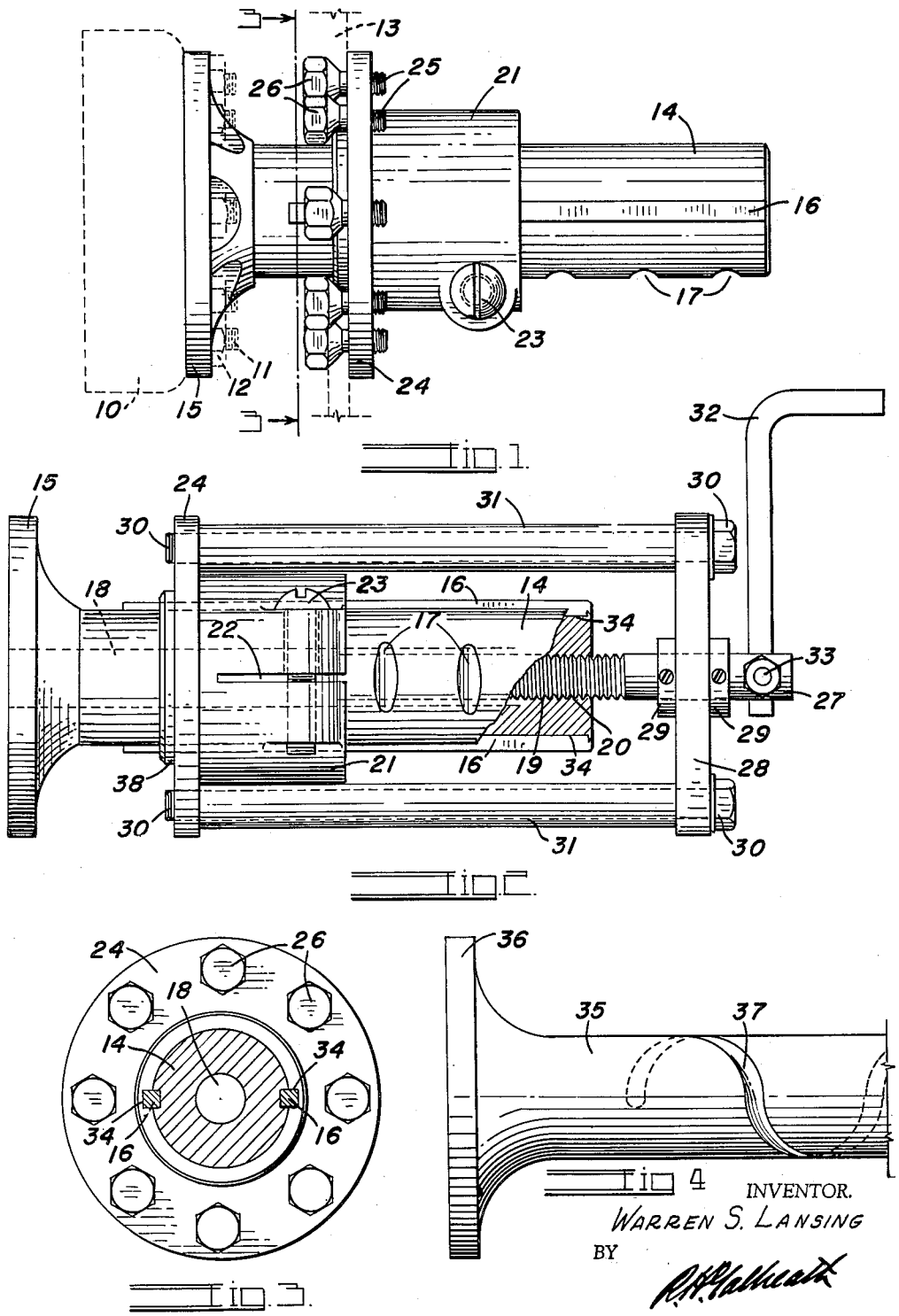

3,000,673
EXTENSION AXLES FOR TRACTORS
Warren S. Lansing, 1528 9th Ave., Greeley, Colo., assignor of one-half to Damon W. Waldhauser, Greeley, Colo.
Filed Mar. 26, 1959, Ser. No. 802,220
1 Claim. (Cl. 301—128)

This invention relates to an extension axle for tractors. It is often necessary to adjust the wheel gauge or tread width of tractors, more particularly for agricultural uses, so as to accommodate various plant row spacings. A minimum amount of tread width adjustment can be obtained by interchanging and reversing the wheel positions on the brake drums of the tractor. Often this is not sufficient to accommodate the desired row spacings.

This invention is designed to provide an increased tread width adjustment of the wheels of a tractor over that which can be obtained by normal wheel interchange.

The principal object of the invention is to provide an extension axle for tractors which can be quickly and easily attached in place on the brake drum of a tractor by means of the conventional wheel lug nuts and which will provide an extension of the tractor axle to enable the wheels to be mounted at any desired spacing outwardly from their conventional positions without requiring any changes in the tractor, the wheels, the brake drums or the wheel mountings.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 1 is a top view of the axle extension for tractors illustrating conventional tractor elements in broken line;

FIG. 2 is a side view thereof, partially broken away, illustrating a wheel adjusting jack designed for use with the extension axle;

FIG. 3 is a cross section taken on the line 3—3, FIG. 1; and

FIG. 4 is a detail view of an alternate form of the axle extension.

In FIG. 1, a tractor brake drum 10, with its conventional wheel lugs 11 and lug nuts 12 is illustrated in broken line. The wheel of the tractor is indicated in broken line at 13 in place on the axle extension.

The invention employs an axle extension unit consisting of a shaft-like extension axle portion 14 extending concentrically of, and at right angles to, a base flange portion 15. The base flange portion 15 is drilled on a bolt circle and a bolt spacing to correspond to the standard spacing of the wheel lugs 11 of the brake drum 10 so that the base flange may be slipped over the lugs 11 into the position normally occupied by the wheel 13 and secured against the brake drum 10, by means of the conventional wheel lug nuts 12, so that the extension axle portion 14 will extend axially outward from the brake drum 10.

The opposite sides of the external surface of the extension axle portion 14 are longitudinally grooved. A longitudinally-extending key 16 is positioned in each of the latter grooves so as to project outwardly from the surface of the portion 14. One side of the external surface of the axle extension portion 14 is provided with longitudinally aligned notches 17 which extend tangentially of the extension axle portion at uniformly spaced intervals. An axial passage 18 is cored in the extension axle portion 14 throughout the length of the latter. The outer extremity of the passage 18 is slightly reduced in diameter, as shown at 19, and this reduced diameter portion is provided with internal threads 20.

A tubular wheel hub 21 is snugly fitted over the extension axle portion 14. The wheel hub 21 is provided with keyways 34 for receiving the keys 16 and with a split 22 which allows it to expand sufficiently to be forced over the axle portion 14. The split 22 can then be contracted by means of a clamp screw 23 to clamp the hub 21 in preset positions along the extension axle portion 14. The clamp screw 23 is so positioned that it will extend partially into any desired one of the notches 17 to prevent either relative rotative or relative longitudinal movement between the hub 21 and the axle portion 14.

The hub 21 is cast integrally with a circular wheel flange 24 which is provided with a concentric wheel centering boss 38 and with an annular plurality of threaded openings for receiving a plurality of wheel screws 25 each of which is provided with a taper head 26 corresponding to the contour of the standard wheel lug nuts 12. The threaded openings in the flange 24 correspond in spacing and position to the positions of the conventional wheel lugs 11 and to the spacing and position of the lug openings in the conventional wheel 13 and can be secured in place against the flange 24 by means of the wheel screws 25, the heads 26 of which will wedge into the lug openings in the wheel, similarly to the wedging action of the conventional lug nuts 12 so as to retain the wheel rigidly against the flange 24 about the centering boss 38 similarly to the manner in which it was formerly retained against the brake drum 10. Thus, the wheel can be moved to any desired longitudinal position along the extension axle portion 14 and locked in place on the latter by inserting and tightening the clamp screw 23.

Due to the fact that the longitudinal adjustment of the wheel must at times be made with the full load of the tractor on the wheels, means must be provided for making the longitudinal adjustment under load. This is accomplished by providing a wheel adjusting jack such as shown in FIG. 2.

The wheel adjusting jack comprises a threaded jackscrew 27 of a size and pitch to be threaded into the internal threads 20 of the extension axle 14. A cross head member 28 is rotatably mounted on the jackscrew 27 between stop collars 29. Two, relatively long spacing bolts 30 extend inwardly through the head member 28 through spacing tubes 31. The inner extremities of the bolts 30 are designed to be threaded into opposite wheel bolt holes in the flange 24, the wheel screws 25 having been removed from the latter holes. It can be seen that tightening of the bolts 30 places the head member 28 in fixed, preset, spaced relation to the wheel flange 24. Rotation of the jackscrew 27 will then cause the head member 28 to move inwardly or outwardly and this movement will be transferred to the hub 21 through the medium of the spacing bolts 30. The rotation of the jackscrew is facilitated by means of a crank handle 32 extending through the outer extremity of the jackscrew and secured therein by means of a handle attachment bolt 33.

It can be seen that by use of the jack member, the hub 21 can be moved longitudinally to any desired position along the axle portion 14. The keyways 34 in the hub 21 allow it to move longitudinally of the keys 16, but prevent relative rotation between the hub and the extension.

An alternate form of the extension axle is illustrated at 35, in FIG. 4, provided with a wheel flange 36 corresponding to the previously described wheel flange portion 15. The flange 36 has bolt holes for receiving the wheel lug bolts 11 as previously described. In this form, the extension axle portion 35 is provided with a spiral groove 37 into which one side of the clamp screw 23 of the hub 21 will extend. In other words, the spiral groove 37 replaces the notches 17 and forms a continuous notch extending spirally of the extension. The screw 23 may be loosened to relieve the clamping action of the hub and the hub can then be rotated relative to the extension axle 35 so as to cause the screw to travel along the spiral groove 37 so that the wheel hub 21 will be moved inwardly or outwardly along the extension 35 to the desired position after which it may be clamped in place by means of the clamp screw 23. The alternate form removes the necessity for the jack structure of FIG. 2 for since the extension axle may be rotated under the power of the tractor engine, it will screw the extension axles inwardly and outwardly in the hubs 21 without further assistance.

While a specific form of the improvement has been described and illustrated herein, it is to be understood that the same may be varied within the scope of the appended claims, without departing from the spirit of the invention.

Having thus described the invention what is claimed and desired secured by Letters Patent is:

In a tractor, an extension axle, a concentric base flange formed on said extension axle and having openings positioned to receive the conventional wheel lugs of a tractor to secure said flange in place against the brake drum of the tractor by means of the usual wheel lug nuts, a hub member surrounding said extension axle, a wheel flange formed on said hub member, threaded wheel screw openings in said wheel flange corresponding in position and number to the wheel lugs of the brake drum for attaching the tractor wheel to said flange, and means for securing said wheel hub at preset longitudinal positions along said extension axle, means for moving said hub member along said extension axle comprising: a threaded axial passage in said extension axle; a jack screw threaded into and extending axially outward from said extension axle; a cross head member rotatably mounted and longitudinally fixed on the outwardly extending portion of said jack screw; bolts extending through said cross head member into opposite ones of the threaded wheel screw openings in said wheel flange for tying said cross head member to said wheel flange; spacing tubes surrounding said bolts and means for rotating said jack screw to cause said cross head member and said hub to move longitudinally in unison along said extension axle.

References Cited in the file of this patent

UNITED STATES PATENTS

| | | |
|---|---|---|
| 1,470,283 | Opitz | Oct. 9, 1923 |
| 1,529,845 | Moeller | Mar. 17, 1925 |
| 1,822,093 | Hendrickson et al. | Sept. 8, 1931 |
| 2,318,802 | Reid | May 11, 1943 |
| 2,562,720 | Ickes | July 31, 1951 |
| 2,569,590 | Van Schoyck | Oct. 2, 1951 |
| 2,604,332 | Kent | July 22, 1952 |
| 2,637,598 | Brown et al. | May 5, 1953 |
| 2,804,157 | Preston | Aug. 27, 1957 |
| 2,819,117 | Glazier | Jan. 7, 1958 |